United States Patent Office 3,031,312
Patented Apr. 24, 1962

3,031,312
PROCESS FOR REMOVAL OF RESIDUAL MOISTURE FROM DEHYDRATED PRODUCTS
Arthur I. Morgan, Jr., Berkeley, Robert P. Graham, El Cerrito, and Lewis F. Ginnette, San Leandro, Calif., assignors to the United States of America as represented by the Secretary of Agriculture
No Drawing. Filed Aug. 23, 1961, Ser. No. 133,531
4 Claims. (Cl. 99—204)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel methods for removing residual moisture from dehydrated products, particularly dehydrated food products. Further objects and advantages of the invention will be evident from the following description wherein parts and percentages are by weight unless otherwise specified.

Various methods are known and actually employed for dehydrating food products. These methods encompass such techniques as dehydration under vacuum with the material retained in the frozen state or with application of sufficient heat to cause the material to expand or puff during dehydration. Methods employing hot air streams at atmospheric pressure are widely used in such applications as drying fruits and vegetables in piece form. Recently, there has been described an efficient method for dehydrating milk, juices and other liquid foods using a system which involves forming the liquid food into a stable foam and then dehydrating this foam by contact with hot air to form a porous, readily rehydratable product.

In general, all of the known dehydration methods are effective to remove the bulk of the moisture from the food product. However, in all cases there remains in the product what may be termed a residual moisture content. The amount of this residual moisture will vary depending on the nature of the material being dried and the conditions of dehydration and in general it is about 5%, although it may be as low as about 2%. For reasons not presently understood it is extremely difficult to remove this residual moisture content and this difficulty may be due to the fact that the moisture is bound to the solid constituents by physical mechanisms of hydration and/or adsorption. If it is attempted to remove this residual moisture by conventional dehydration techniques, it is found that extremely long, hence costly, processing times are involved. Moreover, each increment of residual moisture that is removed involves a progressively longer period of processing. Even using optimum conditions such as extremely low pressures and temperatures just under those deleterious to the product, it is found that the residual moisture is evaporated so extremely slowly that the procedures have no practical value whatever.

Although the residual moisture is present in relatively small amount, it has a deleterious effect. Thus, for products which are to be maintained in prime condition for substantial periods of time it is essential to reduce their content of residual moisture. Since customary dehydration procedures such as vacuum drying are ineffective, as explained above, it has been advocated that the products be packaged in a sealed container together with a packet of a desiccating agent such as calcium oxide. During storage of the product the residual moisture is slowly absorbed by the desiccant so that stability of the product is enhanced. This technique, generally referred to as in-package desiccation, although it is effective in decreasing the content of residual moisture, has several serious disadvantages. A first item is its extreme slowness in that it requires several months to reduce the moisture content to an adequate level. Another point is the cumbersome aspect of the process in that each container of product must be supplied with a packet of desiccant. This not only entails the cost of the desiccant and its packet but the use of extra-size containers to hold not only the standard quantity of product but also the desiccant packet. A further item is the danger of contamination of the product in the event of rough handling or improper opening of the containers.

In accordance with the invention the removal of residual moisture is accomplished by a simple yet effective method. This method involves mixing the dehydrated product with a minor proportion of a volatile liquid and then drying the resulting mixture.

Addition of the volatile liquid causes a profound change so that when drying conditions are applied, the residual moisture (plus volatile liquid) is removed rapidly and effectively. The manner of drying is not critical—any conventional drying system, whether under vacuum or at atmospheric pressure, can be used. Thus the volatile liquid has the critical effect of completely obviating the former difficulty of removing residual moisture. The mechanism by which this drastic difference occurs is not entirely understood but it is believed that on addition of the liquid the water formerly bound to the solids in the product becomes associated with the liquid. In this condition the water has greatly increased mobility so that it is readily removed by applying evaporative conditions to the product containing the added liquid. It might also be said that the added liquid alters the properties of the solids-moisture system so that the moisture is provided with new, enhanced fugacity.

Many different types of liquids can be used in applying the process of the invention. The vital attributes of the liquid are that it be volatile, essentially inert to the product being treated, and exhibit an affinity for water. In general, compounds which contain a hydrophilic group such as a hydroxyl, ketone, or carboxylic group or even a polar group such as chlorine will provide the proper structure for water affinity. To ascertain the suitability of any proposed liquid for use in accordance with the invention, the following test may be employed: To the proposed liquid is added about 1 to 10% its weight of water. The partial pressure of water above the solution is then determined by conventional means. In the event that the partial pressure of water above the solution follows the usual rule (Henry's law)—that the partial pressure of water is proportional to the mol fraction of water in solution—the liquid is not suitable as it does not exhibit any affinity for water. If on the other hand the partial pressure of water above the solution is markedly less than that to be expected by theory, then the liquid in question has affinity for water and is suitable for use in the process of the invention. The liquids used in the process of the invention need not be completely miscible with water and are operative if they will dissolve at least about 5% of their weight of water. Some liquids such as ethanol form azeotropes with water and this factor may be of benefit in removing residual water. However, the process of the invention is not dependent on the formation of azeotropes and liquids such as methanol, which do not form azeotropes with water, are completely satisfactory and indeed perform very effectively. Typical of the liquids which may be employed in a practice of the invention are methanol, absolute ethanol, acetic acid, formic acid, methyl ethyl ketone, isopropyl alcohol, trichloroethylene, 1,4-dioxane, and the like.

The amount of liquid to be used may be varied widely. In general, the amount of liquid should be at least about twice the amount of water present in the dehydrated product being treated. For example, in treating 100 lbs. of dehydrated tomato containing 5% moisture, the minimum amount of liquid will be 10 lbs. Usually, it is preferred to use a greater amount of liquid to ensure proper elimination of moisture. Thus it is generally preferred to employ a weight of liquid about three times the weight of moisture in the product. Larger amounts of liquid can be used if desired but in general it is preferred not to add so much liquid that the product becomes sticky or gummy. If this is done the material on drying will tend to be dense and to have a low rate of rehydration. It is obvious, however, that if rapid rehydration is not a criterion, any amount of liquid above the minimum amount specified herein above may be employed. Generally, for practical purposes, the upper amount of liquid is limited to about 15%, based on the weight of the material being treated, whereby the final product will retain its characteristics of porosity and ease of rehydration.

It will, of course, be appreciated that the particular volatile liquid for use in the process of the invention will be selected according to the use which is to be made of the final product. Thus where the product is intended for edible purposes, the liquid selected will be one which is edible or at least which may be ingested without harmful effects. Thus, for production of edible products it is preferred to use such liquids as ethanol.

Application of the liquid to the dehydrated product to be treated does not involve anything more than a thorough contact or mixing of the two materials. Often it is convenient to apply the liquid by spraying it onto the dehydrated product to be treated. Thus, for example, if the dehydrated product is in powder form or in the form of granules, flakes, or other small particles, it is simply sprayed with the liquid. If the dehydrated product is in the form of larger pieces, it is generally preferred to crumble or otherwise reduce the size of the pieces prior to admixing with the liquid. However, such crumbling or other size reduction is usually not required where the product has a porous surface. Thus for example, freeze-dried products even as large as ¼ inch cubes may be directly sprayed with the liquid without size reduction. On the other hand, products with a glazed surface, as some spray-dried materials, may require size reduction as by crumbling, grinding, etc. to expose fresh surfaces prior to contact with the added liquid. It is generally advantageous to apply cooling during the mixing step or to the mixture prior to final dehydration. Such cooling has the effect of enhancing translocation of moisture from the dehydrated product to the added liquid. Where the cooling step is employed any temperature below room temperature but above the freezing point of the liquid may be employed. Generally, when cooling is applied, temperatures in the range from about 40° F. to about 0° F. are employed.

Following mixing of the dehydrated product with the liquid, the mixture is dried. This drying can be accomplished in any conventional manner. For example, the mixture may be subjected to vacuum at ordinary temperatures (70° F.) or with application of heat to hasten evaporation of the moisture and liquid. Drying methods at atmospheric pressures are equally suitable; thus the mixture can be exposed to a current of warm, dry air. The temperature applied to the mixture, whether in vacuum or atmospheric pressure drying, should be limited to avoid any overheating of the product, thus to prevent deleterious changes in the product. In many cases temperatures of about 70 to 300° F. are suitable. For products of greater instability to heat, a maximum temperature of 150–200° F. is preferred. In any event the drying is continued until the product contains less than 2% moisture, preferably less than 1.5%.

The process of the invention is of wide versatility and can be applied to foods of all types. Typical materials which may be treated in accordance with the invention are set forth below by way of example but not limitation. It is understood that as an initial step these foods (either in the solid state or converted into liquid form by conventional techniques such as extraction with water, comminution, pressing, cooking in water, etc.) are dehydrated to remove the bulk of their moisture content before application of the volatile liquid. This initial dehydration can be performed in any of the conventional ways. Typical methods involve dehydration under vacuum from the frozen state (sublimation) or with the application of sufficient heat to hasten evaporation by causing a puffing of the material under treatment. Atmospheric pressure drying methods involving contact of the foods with currents of hot air are likewise useful. In handling solid foods such as apple slices, carrot dice, potato dice and the like, the food pieces may be contacted with hot air in rotary-kiln, tunnel, or cabinet driers. A preferred method is to employ the continuous belt trough drier of Lowe et al. (Patents 2,745,194 and 2,876,558). Where the food products are liquids they may preferably be dehydrated by the vacuum puff drying method disclosed by Strashun et al., 2,854,343 and 2,959,486, and Kaufman, 2,785,077 and 2,858,226. A special feature of the present invention is to employ as the initial drying the foam-mat dehydration method disclosed by Morgan et al., Patents 2,934,441, 2,955,046, 2,955,943, 2,967,109, and 2,976,158, and Ginnette et al., 2,981,629, as this technique combines efficient and rapid moisture evaporation together with production of extremely porous products which display very rapid rehydration characteristics.

Fruit and vegetable products: Orange, grapefruit, lemon, lime, apple, pear, apricot, strawberry, raspberry, pineapple, grape, prune, peach, plum, cherry, tomato, celery, carrot, spinach, cabbage, potato, sweet potato, watercress, etc. These forms of produce may be treated in the solid state, preferably in chopped, sliced or diced form or reduced to liquids. Such liquid products may be prepared in customary manner by subjecting edible portions of the produce to such operations as reaming, pressing, macerating, crushing, extracting with water, cooking, steaming, etc. These operations may be applied to the fresh produce or to processed produce, that is, fruits or vegetables which have been subjected to such operations as cooking, blanching, freezing, sun-drying, sulphiting, or preservation by application of chemical preservatives or ionizing radiations.

Meat and fish products: Meats such as beef, pork, veal, lamb, chicken. Fish or shellfish. Meat extracts, meat juices, soups or broths made from meat or fish, clam juice, oyster stem, fish or clam chowders, etc.

Lacteal products: Whole milk, buttermilk, skim milk, whey, cream, yogurt, cheeses, milk products containing flavorings such as chocolate, cocoa, sugar, malt and the like.

Cereal products: Rice, wheat, barley, malted barley, corn, oats. Extracts of grains or slurries of finely-divided cereal material.

Beverages: Aqueous extracts of coffee, tea, chocolate, yerba mate, roasted cereal products (simulated coffee products) etc.

Carbohydrate substances: Honey, maple syrup, corn syrup, sorghum syrup, malt syrup, molasses, syrups obtained from the saccharification of wood, cotton linters or other cellulosic materials. Dispersions—that is, true solutions, colloidal solutions, or suspensions—of sucrose, dextrose, invert sugar, fructose, maltose, lactose, dextrins, dextrans, starches, natural gums such as tragacanth, acacia, arabic, locust bean, karaya, carrageen, pectins, algins, low-methoxyl pectins, etc., synthetic gums such as methyl cellulose, carboxymethyl cellulose, carboxymethyl amylose, carboxymethyl amylopectin, etc.

Egg products: Egg white, egg yolk, whole egg, or preparations of egg with other foods such as milk or cream, custard or salad dressing preparations.

Miscellaneous: Gelatin, gluten, solutions of proteins or protein hydrolysates, solutions of sorbitol, mannitol, citric acid, tartaric acid, etc. Vitamin preparation such as solutions of ascorbic acid, thiamin, or other vitamins, vitamin concentrates, or vitamin precursors. Fermentation products such as yeast, mushroom mycelium, microbial cultures, bacterial enzyme preparations, etc.

As briefly noted hereinabove, for best results it is preferred to carry out the initial dehydration of the food in question by the foam-mat dehydration technique. In applying this technique the food is first reduced to a liquid state, if not already a liquid, then formed into a foam which is then dehydrated at atmospheric pressure in a current of hot air. The liquid food to which the process is applied need not be a true solution but may contain suspended matter entirely or in addition to dissolved matter. The procedure in question is thus generically applicable to the dehydration of any liquid, this term being used in the sense of including any type of material which is capable of flowing.

In preparing a foam from the liquid to be dried it is required that the liquid have sufficient body to produce a stable foam. In most cases this requirement is met when the liquid contains so much suspended and/or dissolved solids that it has a thick consistency like that of a syrup, sauce, or paste. Thus, depending on the character of the liquid, it may be necessary to concentrate it by evaporation of water—or other conventional concentration technique—to increase its body. For example, ordinary juices such as orange juice and tomato juice are too thin to form stable foams. Accordingly, the juices are first concentrated to a level of at least about 20% or more, preferably to such an extent that they have a sauce-like or pasty consistency. Ordinary milk is another example of a substance which needs to be concentrated to build up its body prior to foaming it. In cases where the liquid is to be increased in body, this is generally accomplished by removal of water. However, other techniques can be used in place of, or in conjunction with, such techniques. For example, the consistency of juices, purees, and the like, can be increased by application of homogenization or colloid milling. Another plan is to add bodying agents such as dextrins, starch, pectin, algin, or other natural or synthetic gums. In the case of non-edible products, body can be increased by incorporation of minor amounts of finely-divided solids such as kaolin, bentonite, other types of clays, silica, hydrated forms of silica, silicic acid, diatomaceous earths, etc., or water-soluble inorganic bodying agents such as sodium silicate. On the other hand, such materials as molasses, honey, corn syrup, starch pastes, and the like, already have sufficient body that no increase in solids content is needed. Moreover, some materials may require dilution with water to give them proper liquid characteristics. For example, in applying the process to such relatively high-solids materials as pulped raisins, dates, figs, mashed cooked potatoes, or the like, it is generally necessary to add some water to the pulp so that it will flow more readily and will be adaptable to incorporation of a gas to form a foam. It will be evident to those skilled in the art from the above explanation that in any specific instance the liquid to be dehydrated is to be adjusted to a thick, more or less pasty consistency by conventional techniques so that it will be amenable to forming a stable foam.

In preparing the foam, a gas is incorporated into the liquid by conventional techniques. Although air is generally used as the gas it is by no means essential to use it and any gas may be employed. In preparing edible products, non-toxic gases are used such as air, nitrogen, carbon dioxide, nitrous oxide, helium, propane, n-butane, isobutane, dichlorodifluoromethane, trichloromonofluoromethane, or monochlorotrifluoromethane. Incorporation of the gas into the liquid may be accomplished in any of the conventional methods used, for example, in aerating ice cream, salad dressings, etc. A simple method where air is to be incorporated is to whip the liquid with a rotating wire whip which beats air into the mixture. For best results it is preferred that the gas bubbles be dispersed uniformly throughout the foam and be of uniformly small size, i.e., about 100 microns or less in diameter. Such techniques as homogenizing may be employed to increase uniformity and decrease the size of the gas bubbles. Also, the mixture may be cooled during the foaming operation to promote formation of a stable foam. Where cooling is used, any temperature below room temperature may be applied provided it is not low enough to freeze the foam. The amount of gas incorporated into the liquid may be varied widely. Generally it is preferred to incorporate enough gas to increase the volume of the liquid 1.5 times, more preferably about 2 to 3 times. It is evident that the greater the volume increase the more bulky will be the final product because of a greater proportion of volume of voids to total volume. In some cases it may not be desired to produce a too-bulky end product (because of increased packaging costs) and in such case, the volume increase may be limited, say, to not over 5 times. However, if bulk of the final product is not a consideration, the volume increase may be as much as desired, up to, say, 10 or 20 times original volume of the liquid. It is evident from the above that the volume increase achieved in foaming is not a critical item and may be varied as desired under particular circumstances.

In many instances it is not feasible to form a stable foam merely by incorporation of a gas into the liquid. Accordingly, it is preferred to add to the liquid before or during foaming, a minor proportion of a foam-stabilizing agent. The chemical nature of the foam-stabilizing agent is of no moment to the operability of the invention as long as the agent possesses the ability to stabilize foams. Various examples of suitable agents are listed hereinafter. The proportion of foam-stabilizing agent will vary depending on the properties of the liquid, the properties of the agent in question, etc. In general, the proportion of the agent may vary about from 0.1 to 5.0% by weight based on the weight of solids in the liquid. It is naturally desirable to use the lowest proportion of foam-stabilizing agent compatible with production of a stable foam. Thus in any particular case, pilot trials may be conducted with different proportions of stabilizing agent and noting the stability of the foam after incorporation of gas. The stability of the foams may be easily determined by allowing the test batches of foam to stand at room temperature. A suitably stable foam is one which will retain its volume without any separation of gas from liquid for at least ½ hour, preferably at least one hour, when allowed to stand at room temperature.

The foam stabilizer may be a surface active agent or a hydrophilic colloid or a mixture of the two.

Typical examples of classes of surface active agents and individual compounds which may be used are listed below:

Fatty acid monoesters of inner ethers of hexitols, the fatty acids containing at least six carbon atoms. Illustrative of this class are sorbitan monolaurate, sorbitan monomyristate, sorbitan monopalmitate, sorbitan monostearate, sorbitan monooleate, and sorbitan monolinoleate. The corresponding fatty acid esters of mannitan may also be used.

Condensation products of ethylene oxide with sorbitan or mannitan monofatty acid esters. Typical among these compounds are ethylene oxide condensates of sorbitan monolaurate, sorbitan monomyristate, sorbitan monopalmitate, sorbitan monostearate, sorbitan monooleate, and the like. These condensates may contain anywhere from 6 to 60 moles of ethylene oxide per mole of sorbitan monoester.

Condensation products of ethylene oxide with long-chain carboxylic acids, that is, compounds of the formula $$R\text{---}CO\text{---}(OC_2H_4)_n\text{---}OH$$

where R—CO is the acyl radical of a fat acid such as lauric, palmitic, oleic, stearic, etc. and $n$ has a value of from 6 to 60.

Condensation products of ethylene oxide with long-chain aliphatic alcohols, i.e., compounds of the formula $$R\text{---}(OC_2H_4)_n\text{---}OH$$

wherein R is the hydrocarbon radical of a long-chain alcohol such as dodecyl, tetradecyl, hexadecyl, octadecyl, oleyl, etc. and $n$ has a value from 6 to 60.

Mono- or di-esters of sucrose and fatty acids containing at least six carbon atoms. Illustrative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose distearate, sucrose dioleate, and the like.

Monoglycerides of higher fatty acids, for example, glycerol monolaurate, glycerol monomyristate, glycerol monopalmitate, glycerol monostearate, glycerol monooleate.

Salts of higher fatty acids, for example, sodium palmitate, sodium stearate, sodium oleate, or mixtures thereof.

Higher alkyl sulphates, as for example, sodium dodecyl sulphate, sodium tetradecyl sulphate, sodium hexadecyl sulphate, sodium octadecyl sulphate, sodium oleyl sulphate.

Higher alkyl sulphonates, e.g., sodium dodecane sulphonate, sodium tetradecane sulphonate, sodium hexadecane sulphonate, sodium octadecane sulphonate, sodium oleyl sulphonate.

Alkylaryl sulphonates such as the medium alkyl ($C_8$–$C_{20}$) benzene sulphonates. Typical in this class are sodium dodecyl benzene sulphonate and sodium hexadecyl benzene sulphonate.

Alkyl esters of sulphosuccinic acid, for example, the sodium salt of dioctyl sulphosuccinate.

Sulphonated or sulphated fatty acid esters or amides, i.e., compounds of the types:

$$RCO\text{---}O\text{---}CH_2\text{---}CH_2\text{---}SO_3Na$$
$$RCO\text{---}NH\text{---}CH_2\text{---}CH_2SO_3Na$$
$$RCO\text{---}O\text{---}CH_2\text{---}CH_2OSO_3Na$$

and $$RCO\text{---}NH\text{---}CH_2\text{---}CH_2\text{---}OSO_3Na$$

wherein RCO— represents the acyl radical of a long-chain fatty acid such as lauric, myristic, palmitic, stearic, oleic, etc.

Condensates of ethylene oxide and alkyl phenols, that is, compounds of the type, $R\text{---}C_6H_4\text{---}(OC_2H_4)_nOH$ wherein R represents an alkyl radical containing 6 to 20 carbon atoms and $n$ has a value of about 6 to 30.

Salts of bile acids, for example, bile salts as obtained from animal sources or alkali metal salts of individual bile acids such as cholic acid, dehydrocholic acid, desoxycholic acid, hydrodesoxycholic acid, dehydrodesoxycholic acid, dehydrohyodesoxycholic acid, lithocholic acid, glycocholic acid, or taurocholic acid.

It will of course be appreciated that the particular surface active agent for use in the process of the invention be selected according to the use which is to be made of the final product. Thus, where the product is intended for edible purposes, the surface active agent selected will be one which is edible or at least which may be ingested without adverse effects. Thus, for the production of edible products, we prefer to use surface active agents of the class of fatty acid esters of sorbitan or mannitan, agents of the class of polyoxyethylene sorbitan (or mannitan) fatty acid esters, agents of the class of polyoxyethylene derivatives of higher fatty acids, e.g., polyoxyethylene monostearate, agents of the class of sucrose mono- or di-esters with higher fatty acids, agents of the class of glycerol monoesters of higher fatty acid esters, agents of the class of bile salts, etc.

Generally it is preferred to employ surface active agents in order to stabilize the foam for dehydration since these agents are especially effective even when employed in very small proportion, for example, from 0.1 to 2% by weight based on the weight of solids in the liquid. However, the foam stabilizer may be a mixture of a surface active agent and a hydrophilic colloid or may be a hydrophilic colloid alone.

Typical examples of hydrophilic colloids which may be employed are: Albumin, dried egg-white, dried glucose-free egg-white, gelatin, sodium gluten sulphate, sodium gluten phosphate, polyvinylpyrrolidone, polyvinyl alcohol, soluble starch, sodium carboxymethyl cellulose, methyl cellulose, agar, gum tragacanth, gum arabic, gum acacia, gum karaya, carragheen, alginic acid, sodium alginate, pectin, dextran, dextrin, sodium carboxymethyl starch, sodium carboxymethyl amylose, sodium carboxymethyl amylopectin, pentosans, etc. Generally, it is preferred to employ as the hydrophilic colloid, water-dispersible proteins such as albumin, dried-egg white preparations, or the like.

Having prepared a foam as above described, it is subjected to dehydration to produce a porous dry product. To enhance the surface of the foam exposed to the drying conditions, it is preferred that it be in the form of a relatively thin layer, for example, an elongated sheet or strings, rods, or other filamentary shapes. The foam may be shaped into such structures by application of conventional extrusion procedures. Generally, the foam is formed into bodies having a thickness of about 0.01 to 0.5 inch. The foam may then be dehydrated while supported on trays or equivalent supports, perforated or imperforate. In a preferred modification, the foam is formed into a cratered or perforated mat. This may be accomplished as disclosed in the U.S. patent of L. F. Ginnette et al., No. 2,981,629 of April 25, 1961. To this end, the foam is spread as a mat on a perforated sheet. The thickness of the mat is generally about from 0.01 to 0.5 inch. In applying the foam onto the perforated sheet, the applicator means may be one that deposits the foam only onto the top surface of the sheet. As the perforated sheet, various structures may be used. A preferred structure is the ordinary perforated sheet metal of commerce which is provided with circular apertures in staggered rows. Typically, such sheets may have holes from about 1/16" to 1/2" in diameter, spaced on centers to provide an open area of anywhere from 20 to 60% of the total area of the sheet. The sheet bearing the mat of foam is then subjected to a blast of air or other gas directed upwardly through the perforations in the sheet. This blast of gas causes the portions of foam in and overlying the perforations to be upwardly and laterally away from the perforations toward imperforate sections of the supporting surface. The net result is that the layer of foam is now perforated, the perforations in the mat of foam corresponding with the perforations in the supporting surface. Because of the stiff nature of the foam, this new configuration is stable and is retained during subsequent treatment. The perforated foam is in prime condition for dehydration because its surface area has been multiplied many times. Depending on such factors as the depth of the mat of foam and the structure of the supporting surface, particularly the proportion of free space therein, the surface area may be multiplied anywhere from 5 to 25 times, or more. Having prepared this perforated mat of foam, it is subjected to dehydration as described herein.

After the foam has been shaped into a desired configuration, as explained above, it is subjected to dehydration. Various methods and equipment can be employed for this purpose. For example, the foam may be subjected to vacuum. During application of the vacuum, heat may be applied, for example, by radiant heaters which direct their energy to the foam, to the support carrying the foam, or to both at the same time. As with other dehydration procedures disclosed below, the amount of heat applied is limited to avoid any substantial reduction in the volume of the foam. Although vacuum dehydration may be used it is not preferred because of the expense of the equipment and the high cost of maintaining the vacuum. Thus, we prefer to conduct the dehydration by applying a hot gas to the foam under normal (atmospheric) pressure. Generally, air is used as the gaseous medium for this dehydration but it is by no means essential to use it. Thus, if desired, oxygen-free gases may be used to avoid any possibility of oxidation of the product. In such event one may use inert gases such as nitrogen; carbon dioxide; helium; or combustion gases resulting from the burning of coal, coke, petroleum oils, or more preferably natural gas. It is, of course, obvious that where food products are being treated the gaseous medium should be non-toxic.

In conducting the dehydration by application of a heated gas, one may use, for example, conventional cabinet driers wherein trays bearing the foam are subjected to a current of hot gaseous medium. Continuous dehydrators of various types may be used, for example, driers equipped with mechanical drive arrangements to move a supporting means—individual trays or a continuous belt—bearing the foam through the apparatus while it is contacted with hot gas. Various systems may be used for applying the gas to the foam, for example, the gas stream may be applied in concurrent, countercurrent, or cross-wise directions. In drying a perforated mat of foam, it is preferred to force the gas stream through the perforations in the mat of foam. Systems employing a compartmentalized dehydrator may be used to provide different gas temperatures at different stages as the material is dehydrated. Such systems are useful to obtain a high rate of moisture evaporation (by use of a high gas temperature) while the material is quite wet and the danger of overheating the product is remote. In succeeding stages the temperature of the gas may be reduced to avoid overheating as the product becomes drier and its temperature tends to approach that of the gas stream.

Generally, the temperature of the gaseous medium may range from about 100 to 300° F. Within this range the temperature may be varied in individual cases depending on such factors as the properties of the material being dried, the through-put, the rate of drying desired, and so forth. Generally, it is desired to employ as high a temperature as possible to achieve a rapid rate of dehydration. However, the temperature should not be so high as to overheat the product or cause the foam to decrease substantially in volume. Also, if the foam is in the form of a perforated mat, it should not be overheated to the extent of causing it to sag into and plug the perforations. To ensure such results, the foam may be kept under observation during dehydration and the temperature of the gas reduced if the foam shows a tendency to decrease in volume or sag to any substantial extent. It is impossible to set forth numerical temperature limits in this connection because the stability of the foam will depend on many factors including efficacy of the foam-stabilizing agent used, temperature of the foam, moisture content of the foam, size of gas bubbles in the foam, rate of heating of the foam, softening temperature of the product, etc. However, in any particular instance the gas temperature may be controlled in accordance with visual observation and this system of control affords a more reliable guide than could numerical limits. Generally, the dehydration is continued until there is formed a solid product containing at most about 5% moisture.

After the product has been dehydrated it is mixed with a volatile liquid and subjected to evaporative conditions to remove the residual moisture and added liquid, as described hereinabove.

The invention is further demonstrated by the following illustrative examples:

*Example I*

A. Orange juice was concentrated to 55% solids content. One hundred parts of the concentrate was mixed with 0.4 part of solubilized soya protein and 0.1 part of low viscosity methyl cellulose. The mixture was beaten in air to produce a foam having a density of 0.35 g. per ml. This foam was spread out as 1/8 inch diameter extrusions on a belt moving through an air stream of 200 ft. per minute velocity. The air temperature decreased from 180° F. to 130° F. during a 12-minute drying period. The crisp, dry extrusions containing 3% moisture were collected and crumbled.

B. Ten parts of absolute ethanol was sprayed onto 100 parts of the above-described dry, crumbled product, using enough mixing to form a homogeneous mealy mass. This mixture was then exposed to vacuum for 2 hours at 70° F. The resulting powder was found to contain 0.7% moisture and was free from ethanol odor.

C. For comparative purposes, a sample of the dry, crumbled product, produced as in part A, without addition of ethanol was exposed to the same vacuum for 2 hours at 70° F. The product in this case contained 2.6% moisture.

*Example II*

A. Fresh carrots were diced into 1/4 inch cubes. The carrot cubes were steam-cooked, frozen, then dried at 10° F. by subliming the ice phase into a vacuum of 0.2 mm. of mercury. After 6 hours, the cubes had a moisture content of 5%.

B. To 100 parts of the above-described dried carrot cubes was added 10 parts of dry methanol and the mixture was allowed to stand at room temperature for 30 minutes. This material was then exposed to a gentle air stream at 100° F. for 2 hours. The resulting product had a moisture content of 0.8% and contained no detectable amount of methanol.

C. For comparative purposes, a sample of the dry carrot cubes, produced as in part A, without addition of methanol were subjected to the same air stream (100° F., 2 hours) as in part B. In this case, however, the moisture content of the product was still 5%.

*Example III*

A. Foam-mat dried tomato paste was produced in a manner similar to that of Example I, part A, except that glycerol monostearate was used instead of soya protein and methyl cellulose. The dry product in the form of a coarse powder contained 2.5% moisture.

B. The above tomato powder (100 parts) was mixed by stirring with 15 parts of methanol. The mixture was cooled quickly to 20° F. and held at this temperature for 30 minutes. It was then dried in vacuum at 70° F. for 3 hours. The resulting powder contained 0.5% moisture.

C. For comparative purposes a sample of the coarse powder, produced as in part A, without addition of methanol was subjected to the same drying conditions as in part B. The product in this case contained 2% moisture.

Having thus described the invention, what is claimed is:

1. The process which comprises gasifying a liquid food material and forming it into a stable foam, dehydrating the foam to produce a porous dehydrated product containing residual, difficultly-removable moisture, mixing said dehydrated product with a volatile, essentially-inert liquid having an affinity for water, and subjecting the mixture to evaporative conditions to remove residual moisture and added liquid.

2. The process for removing residual moisture from dehydrated food products which comprises mixing a dehydrated food product containing residual, difficultly-removable moisture with a volatile, essentially-inert liquid which has an affinity for water, and subjecting the mixture to evaporative conditions to remove residual moisture and added liquid.

3. A process for removing residual moisture from porous dehydrated food products with retention of the porosity of the product which comprises mixing a porous dehydrated food product containing residual, difficultly-removable moisture with a volatile essentially-inert liquid having an affinity for water, the amount of liquid being not over about 15% of the weight of the product, and subjecting the mixture to evaporative conditions to remove the residual moisture and added liquid.

4. The process which comprises subjecting moist food material to dehydration to remove the bulk of the moisture content and to produce a dehydrated product containing residual, difficultly-removable moisture, mixing said dehydrated product with a volatile, essentially-inert liquid which has an affinity for water, and subjecting the mixture to evaporative conditions to remove residual moisture and added liquid.

References Cited in the file of this patent
UNITED STATES PATENTS

| | | |
|---|---|---|
| 2,729,567 | Heisler | Jan. 3, 1956 |
| 2,955,046 | Morgan | Oct. 4, 1960 |